TELEPHONE APPARATUS

Filed Dec. 8, 1953 4 Sheets-Sheet 1

INVENTORS
James Russell Stewart
Robert P. Crow
BY
Mueller & Aichele
Attys.

INVENTORS
James Russell Stewart
Robert P. Crow
BY Mueller & Aichele
Attys.

INVENTORS
James Russell Stewart
Robert P. Crow
BY Mueller & Aichele
Attys.

INVENTORS
James Russell Stewart
Robert P. Crow
BY
Mueller & Aichele
Attys.

United States Patent Office 2,809,236

Patented Oct. 8, 1957

2,809,236

TELEPHONE APPARATUS

James Russell Stewart, Glen Ellyn, and Robert P. Crow, Park Ridge, Ill., assignors to Motorola, Inc., Chicago, Ill., a corporation of Illinois Application December 8, 1953, Serial No. 396,882

9 Claims. (Cl. 179—18)

Figure 1:
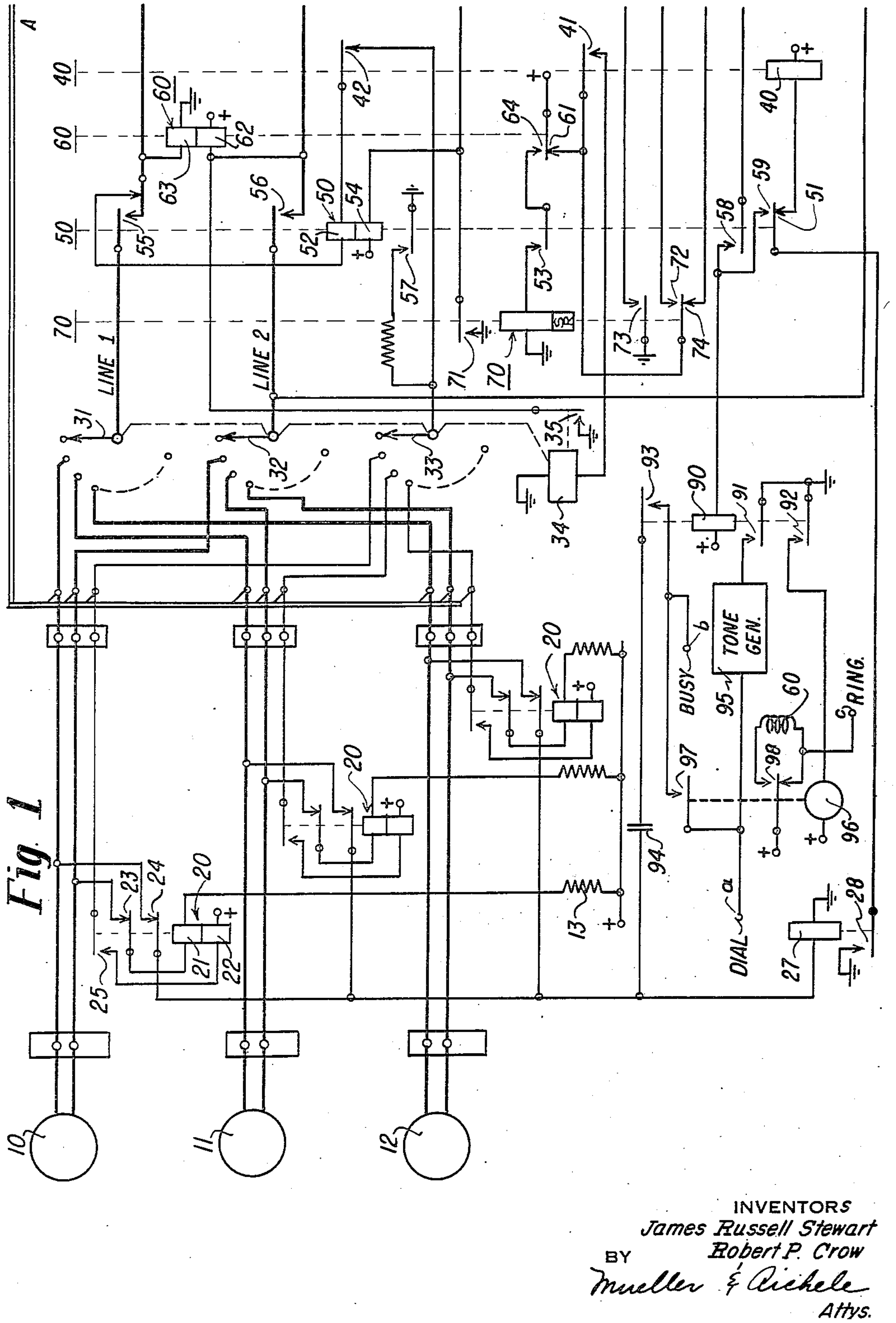

This invention relates generally to automatic telephone switching systems, and more particularly to a system wherein a plurality of small exchanges are interconnected by trunk circuits and any telephone extension may dial any other extension at the local or a remote exchange in a common directory dialing system in which an extension has the same code number for either a local or a remote call.

Although automatic telephone switching systems are well-known in the art, such systems are for the most part designed for use with a very large number of extensions or telephones and therefore the systems are quite complicated. There are many applications wherein it is desired to provide an automatic switching system for use with a relatively small number of exchanges each of which has a small number of extensions. In such a system it is desirable to use a common directory dialing arrangement wherein the same number is dialed to call a particular extension whether the call originates from the local exchange or from a remote exchange. That is, a simple means is desired to provide dialing without the requirement of a prefix for each particular exchange when it is dialed from a remote point but which need not be dialed when the call originates from the local exchange.

It is therefore an object of the present invention to provide a simple and improved common directory automatic dial telephone switching system.

A further object of this invention is to provide an automatic telephone switching system wherein interconnection between the exchanges may be provided by either wire lines or by carrier channels such as microwave or power line carrier channels.

Another object of the invention is to provide an automatic dial switching system wherein the number to be dialed for any extension is the same whether the call is made from its own exchange or from another exchange, with the same equipment which identifies a number dialed as a local call, sending out a code to other exchanges to identify the called exchange in the event of calls from one exchange to another.

A feature of this invention is the provision of an automatic telephone switching system wherein the first number or numbers dialed are applied to a stepping switch within the local exchange and if the numbers are for a local extension the connection is made through the local exchange without any contact to the remote exchange, but if the numbers do not designate a local exchange connection is made to the remote exchanges and the number of steps remaining to home the switch is used to designate a particular remote exchange.

Another feature of this invention is the provision of an automatic telephone switching system coupled to a carrier channel such as microwave or power line carrier and having selector means at each exchange which control the exchange so that interconnections to called stations which are within the local exchange are made without any connection to remote exchanges on the carrier and wherein the connection to extensions at remote exchanges are made within the same switching sequence and by the use of a common directory dialing number system.

Figure 2:
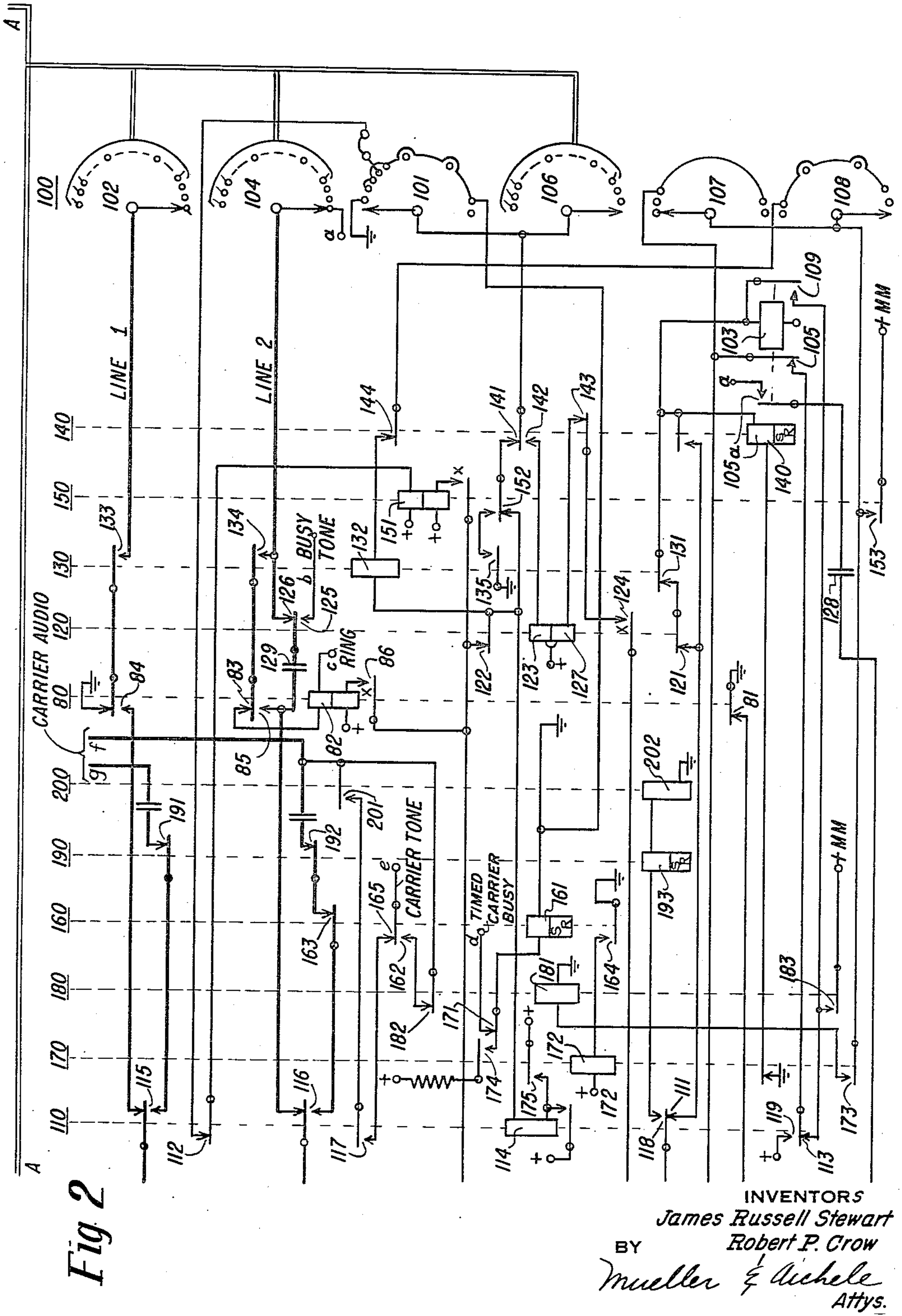
Figure 3:
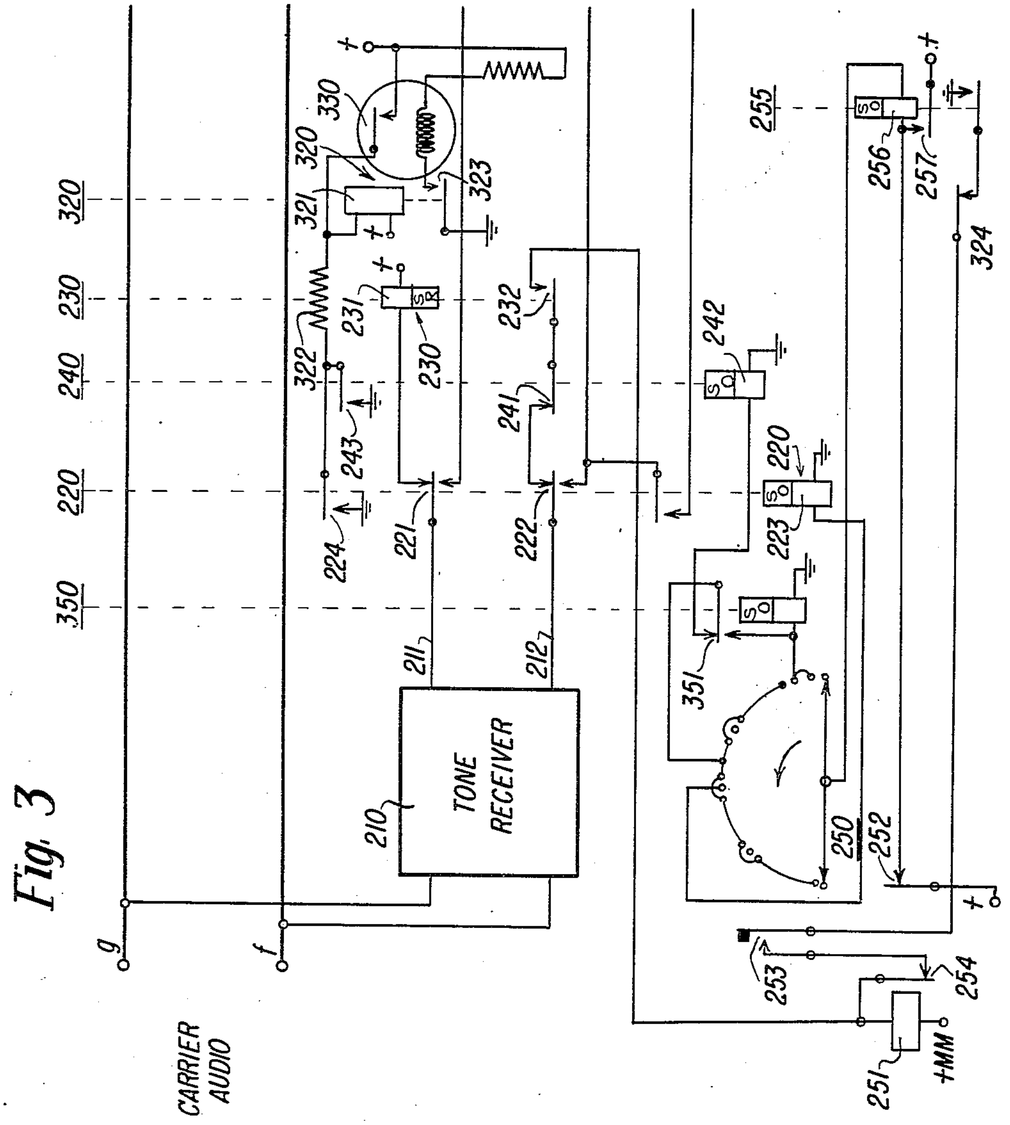
Figure 4:
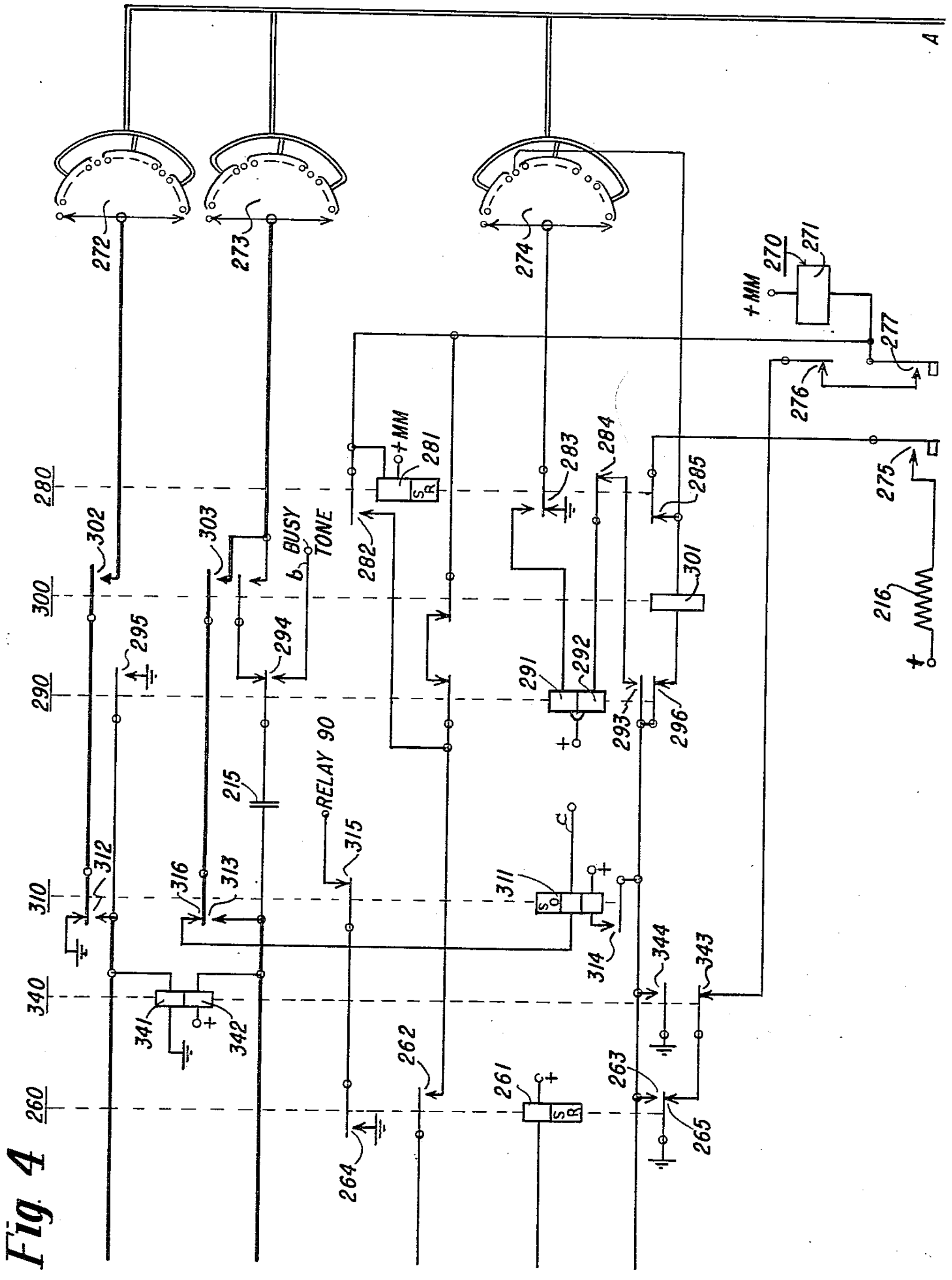

Further objects, features and the attending advantages of the invention will be apparent from a consideration of the following description when taken in connection with the accompanying drawings, wherein:

Figs. 1 and 2 illustrate the equipment at each local exchange required for making a connection within the local exchange; and Figs. 3 and 4 illustrate the equipment for receiving a call from a remote exchange and for making the connection.

In practicing the invention there is provided a common directory telephone system wherein a plurality of exchanges are interconnected by common trunk lines, and each exchange includes dial controlled switching apparatus connected to a plurality of dial telephone extensions. The switching apparatus includes line relays and line finder switches which operate to apply dialing pulses to selecting apparatus which includes a stepping switch. The telephone numbers used include a first digit or digits which are dialed to provide a first series of pulses identifying the exchange and a second digit or digits which are dialed to provide a second series of pulses identifying the extension. When dialing a number, the first series of pulses operates the stepping switch until it reaches a certain contact. If this contact identifies its own (the calling) exchange, the system operates to make a connection to the particular extension called which is identified by the second series of pulses. A single stepping switch may include a first portion for making the selection and a second portion for providing the connection. Such an operation takes place entirely within a single exchange.

When the first series of pulses identifies a different exchange, the stepping switch is homed to the last contact in the selecting portion thereof, and during this homing operation pulses are produced by each step-by-step movement. These pulses are applied to all the other exchanges and operate selecting equipment there. The number of pulses produced by homing is complementally related to the first series of pulses dialed and serves to select a particular exchange. Connections are provided for applying the second series of pulses to the selected exchange to make connection to a called telephone extension in that exchange.

*Calling an extension within a local exchange*

Figs. 1 and 2 together disclose the complete system required for dialing and connecting from one extension at a local exchange to another extension at the same exchange. Individual telephones of extensions 10, 11 and 12 are illustrated at the local exchange but it will be understood that a larger number of extensions may be provided if this is desired. Each telephone is connected to a line relay 20 in the local exchange. Only three lines are required from the line relays to the link circuit which makes a connection within the local exchange.

The three lines from the relays 20 are connected to three levels of the line finder stepping switch 30. These three lines include two audio lines from the telephone and one control line. The audio lines are connected to levels 31 and 32 and the control line is connected to level 33. Connections from the line relay associated with extension 10 are connected to the No. 1 contacts of each level, connections from extension 11 to the No. 2 contacts, and so on. It is therefore apparent that the number of telephones which may be provided in an exchange is limited by the number of contacts on each level of the stepping switch 30. In order to provide more than one operative connection at the same time a plurality of link circuits will be required with each having a line finder switch with the contacts of the various switches all connected in parallel so that any line finder may make connection to any one of the telephones at the local exchange.

The relays 20 are of the two-step type having a first coil 21 and a second coil 22. When the hand set of the extension connected to a line relay is lifted, the lines from the extension are interconnected to provide a circuit from the plus battery through resistor 13, relay coil 21, closed contacts 23 of relay 20, the local extension, closed contacts 24 and the coil of relay 27 to ground. Energization of the coil 21 partially actuates the relay 20 so that the contacts 25 thereof close. Closing of the contacts 25 will provide a positive potential on the control line to the level 33 of stepping switch 30 from plus battery through the coil 22 of the relay 20.

As relay 27 was energized at the same time preliminary energization of relay 20 was effected, contacts 28 of this relay will close. Contacts 28 are effective to energize the line finder start relay 40 through the closed contacts 51 of the stop relay 50. This closes contacts 41 of the line finder start relay 40 to provide positive potential to the line finder motor magnet 34 through the closed contacts 61 of relay 60. Energization of the magnet 34 cocks the line finder stepping switch 30 and closes interrupter contacts 35 thereof. This energizes the coil 62 of relay 60 to open the contacts 61 whereby the magnet 34 is deenergized. This action continues in a step-by-step manner to step the line finder switch.

This action continues until the movable contact at level 33 engages a fixed contact having a positive potential thereon resulting from energization of the associated line relay 20. When this takes place the potential from the level 33 is applied through closed contacts 42 of relay 40 to the winding 52 of the relay 50 and the winding 63 of the relay 60 to ground. Accordingly relays 50 and 60 are operated, with the relay 60 opening contacts 61 to stop the movement of the line finder stepping switch so that it remains on the marked line. The relay contacts 64 close and the relay contacts 53 also close to thereby energize relay 70. This closes contact 71 to energize winding 54 of the relay 50 to provide full energization of this relay.

Full energization of relay 50 closes contacts 55, 56, 57 and 58 of the relay, and opens contacts 51 and closes contacts 59. Contacts 55 and 56 interconnect lines 1 and 2 through the stepping switch levels 31 and 32 to the relay 60 so that battery is applied to the lines through the coils of this relay. Contacts 57 provide a ground to the level 33 of the line finder stepping switch 30 so that the coil 22 of line relay 20 is energized to completely pull in this relay and release the contacts 23 and 24 thereof. Closing of the contacts 58 of relay 50 completes a circuit through the closed contact 81 of relay 80 (Fig. 2) to energize the relay 90 and closes contacts 91, 92 and 93 thereof.

Contact 91 of relay 90 energizes the tone generator 95 to provide a dial tone. Contact 92 energizes the interrupter 96 to interrupt the dial tone to provide a busy tone through the interrupting contact 97. The interrupter 96 also operates interrupting contact 98 to superimpose 60 cycle ringing current on direct current for use as a ringing tone. The dial, busy, and ringing tones are available at terminals *a*, *b* and *c* respectively.

The busy tone is applied through contacts 93 and condenser 94 to the contacts 24 of line relays 20. However, the contacts 24 of the line relay for the station which is calling will be open so that busy tone will not be heard through this connection. The dial tone from terminal *a* is applied to fixed contact 26 of the level 104 of the connector stepping switch 100. The movable contact of this level is connected to line 2 through a plurality of relay contacts which will later be described. This dial tone is heard by the calling party over line 2 and is an indication that dialing may commence.

As has been previously stated, relay 60 is held operative by the connection through the lines 1 and 2. As dialing takes place this connection is interrupted. This operation of the relay 60 interrupts energization of the motor 103 of the stepping switch 100 which operates as a selector and connector. This circuit is completed through the contacts 61 of the relay 60, contacts 72 of the closed relay 70, contacts 111 of the relay 110, contacts 121 of relay 120, and contacts 131 of the relay 130 to the motor 103. Dialing pulses will therefore cause the stepping switch 100 to move in a step-by-step manner from one contact to the next. Relay 140 is connected in parallel with the motor 103 and is a slow release relay that remains operative during any series of dialing pulses but releases between series of dialing pulses.

One point on the stepping switch 100 will identify all calls to extensions within the local station. If, for example, this point is 4; that is, numbers of the local station all start with 4, the contact No. 4 on level 101 is connected through contact 112 of relay 110 to the coil 151 of relay 150. The movable contact of level 101 is connected through contact 141 of relay 140, contacts 152 of relay 150 through contacts 122 of relay 120, and contact 71 of relay 70 to ground. Accordingly, if the stepping switch 100 has been moved to the No. 4 position, and the relay 140 releases after a series of pulses, the coil 151 of the relay 150 will be energized. This relay indicates that the extension called is a local extension and that connection to remote extensions is unnecessary.

Operation of the relay 150 closes contacts 153 thereof to provide a potential to the wiper on level 107 which makes connection to the No. 4 contact. This potential is applied through a contact strapping circuit on level 107 to the interrupter contact 105 of the stepping switch 100 and through the contacts 113 of relay 110 back to the off normal contacts 109 of the stepping switch 100 and to the motor magnet 103 of the stepping switch which is grounded. This causes the stepping switch to continue operation until the last contact is reached which is open on level 107 to break the circuit. The stepping switch 100 includes a second set of interrupter contacts 105*a* which intermittently close as the stepping switch moves and applies an interrupted dial tone from terminal *a* through condenser 128 to the level 32 of the line finder 30. This causes an interrupted dial tone to be transmitted over line 2 to the calling extension as an indication that the switch 100 is moving. When the switch stops the interrupting dial tone will cease which indicates that dialing may proceed.

After the first number or numbers have been dialed which in the case described indicates that the party being called is at the local exchange, the dial number or numbers representing the called extension at the exchange may be dialed. This causes the stepping switch 100 to continue its movement. As previously stated the stepping switch 100 serves as the connector switch for calls within the exchange and the contacts on levels 102, 104 and 106 thereof are connected to the audio lines and the control lines of the various line relays 20.

At the conclusion of this dialing the relay 140 will remain operated for a period of time since it is slow to release. The stepping switch 100 will have moved to the position of the called party and the movable contact of level 106 thereof will be connected to the third line from the line relay 20 of this extension. If the extension called is busy, this third line will be grounded from one of a number of sources, for a local connection the ground originates at closed contacts 57 and is applied through level 33 of switch 30. The ground will be continued through level 106 and closed contacts 142 of the relay 140 to the coil 123 of relay 120. When the relay 140 does release, the relay 120 remains locked in through contacts 143 of the relay 140, its own contacts 124 and contacts 73 of the relay 70. The relay 120 sends the busy tone to the calling party through contacts 125 which are now closed to send the busy tone through condenser 129 to the line 2 of the calling extension. The relay 120 also opens the ground path for the relay 130 so that this relay will not be operated when the relay 140 releases and thus prevents the calling party from being cut in to a busy line. This is accomplished by opening contacts 122 which removes the ground from the coil 132 of relay 130.

If the called line is not busy and the line 3 thereof is not grounded, the relay 120 will not operate. Accordingly the relay 130 is energized through the contacts 144 of relay 140, level 108 and contacts 153 of relay 150 to the plus potential. Relay 130 causes the contacts 133 and 134 and 135 thereof to close to apply ground to lines 1 and 3 at the called extension, and to provide ringing current from ring source C through coil 82 and contacts 83 of the relay 80 through contact 134 to the level 104 and to line 2 of the called party. The calling party will hear the ringing through the contacts 134 of relay 130, closed contacts 126 of relay 120 and condenser 129.

When the called party picks up his hand set to answer, lines 1 and 2 will close to establish a direct current through the coil 82 of the relay 80 to energize this relay and close contacts 84 and 85 to complete the connection of lines 1 and 2 between the calling party and the called party. Contact 86 will also close to form a holding circuit for the relay 80 through the closed contact 71 of relay 70. The operation of relay 80 also opens contacts 81 thereof to remove ground from the relay 90 which applies the various tones for dialing, busy and ringing.

During the conversation both parties get their talking battery power through the coils of the relay 60. When the conversation is completed and the parties hang up, the last party to replace his hand set will open the circuit of the relay 60 so that this relay will release. Release of the relay 60 will open contacts 64 thereof to release the relay 70 which will open all of the holding circuits to the other relays. The switch 100 will return to its final or home position by energization through contact 61 of relay 60, 74 of relay 70, interrupter contacts 105, contacts 113 of relay 110, and the off normal contacts 109 to the motor magnet 103. This will continue until the switch is at the home position when the off normal contacts will open.

*Calling an extension at a remote exchange*

When dialing a number at a remote exchange, the line relay and line finder switch will operate exactly the same as previously described. Further, the initial operation of the link circuit to determine whether the number is in the local exchange or not will be exactly the same. However, after the first digits have been dialed and the local station is not selected, the relay 140 will remain operated for a short time to provide a circuit for relay coil 123 through contacts 142 of relay 140, level 101 of switch 100 to the strapped contacts thereon to the coil 161 of relay 160 and closed contacts 171 of relay 170 to the terminal *d* which is grounded when the carrier or trunk line to the remote exchanges busy. If this line is grounded the relay 120 will be energized to close contacts 125 to put a busy signal on line 2.

Although the coil 161 of relay 160 is connected in series with the coil 123 of relay 120, the relay 160 will not operate because most of the voltage drop is across the coil 123. The relay 120 locks in its winding 127 through contacts 143 of relay 140 and its own contacts 124. However, when the carrier or trunk is not busy the terminal *d* will have 30 volts positive potential thereon which will cause operation of the coil 161 of relay 160 through the level 101 of connector switch 100, contacts 141 of relay 140, contacts 152 of relay 150, contacts 122 of relay 120, and contacts 71 of relay 70 to ground. Relay 160 closes contacts 162 thereof to complete a circuit from the carrier tone terminal *e* to the carrier audio line *f*. The relay 160 opens contacts 163 so that line 2 is not directly connected to the carrier audio terminal *f*. Relay 160 also closes contacts 164 thereof to energize the coil 172 of relay 170. Relay 170 closes contacts 173 thereof to prepare a path for energizing the coil 181 of relay 180 by relay 110. Relay 170 closes contacts 174 thereof to apply a positive potential to coil 161 and this action opens contacts 171 to remove the connection from the trunk or carrier busy signal *d*. Relay 170 also closes relay 110 by completing a circuit from positive potential through contacts 175 to the coil 114 of relay 110, which is completed through contacts 122 of relay 120 and contact 71 of relay 70. Operation of the relay 110 closes contacts 115 and 116 thereof which connect the calling lines 1 and 2 to the carrier audio circuit lines designated *g* and *f* through the contacts 191 and 192 of relay 190. The relay 110 opens contacts 112 to remove a ground circuit from the relay 150 so that it cannot operate to provide a local connection. The relay 110 also closes contacts 117 so that when the relay 160 releases the tone is transferred through contact 165 thereof, through contacts 117, and through contacts 201 of relay 200 to the outgoing line *f*. Relay 110 also closes its contacts 118 to apply the pulses to the outgoing line by operation of coil 202 of relay 200 and coil 193 of relay 190. Relay 110 also establishes connection 119 to apply positive potential to relay 181 through interrupter contact 105, through level 107, and through contact 173 of relay 170. Relay 181 closes its contacts 183 to apply positive potential to the motor magnet 103 of connector switch 100 through off normal contact 109.

Accordingly when the motor magnet 103 operates, it opens the interrupter contacts 105 and breaks the circuit to level 107 which continues through contacts 173 of relay 170 to the winding 181 of relay 180. This releases relay 180 which opens contacts 182 thereof, and closes contacts 183 to again apply potential through the off normal contacts 109 to the motor magnet 103 of the stepping switch 100. This operation continues until the wiper of level 107 reaches the last or home contact which is not connected to the interrupter contact and thereby opens the circuit. During this operation interrupted dial tone is again applied to the calling line through the interrupter contact 105*a* and through condenser 128 in a manner previously described. This interrupted dial tone during homing of the stepping switch is a signal that further dialing should not be started. However, when the pulsed tone stops, the calling station can proceed with the dialing. During the homing operation, the relay 180 interrupts the carrier tone applied to the terminal *f* the number of times required for the stepping switch 100 to complete its travel to the last or home position. When using stepping switches with 26 contacts, if the number 7 was dialed originally, there would be 19 more steps and 19 pulses would therefore be applied to the carrier line *f*.

When the connector switch 100 reaches its last or home position, relay 160 is released as the last contact or level 101 is not connected and the circuit from the wiper is broken. Relay 160 therefore release contacts 164 to release the relay 170. Release of relay 160 also causes contacts 162 to open and contacts 165 to close so that the carrier tone is applied through contacts 117 of relay 110 and contact 201 of relay 200 to line *f*. Further dialing at the local station then pulses the relay 60 which in turn pulses relay 200 through contact 61 of relay 60, contact 72 of relay 70, contact 118 of relay 110, coil 193 of relay 190, and to coil 202 of relay 200. Contacts 201 on relay 200 thereby again apply carrier tone to line *f* at a pulsing rate in accordance with a digit dialed at the local station. After dialing is completed the relays 190 and 200 both release so that the audio lines 1 and 2 are applied to the carrier audio lines *f* and *g*.

Considering now the operation at the remote exchange, reference is made to Figs. 3 and 4 which together provide the equipment at an exchange for making a connection from a call originating from a different exchange.

At each station there is provided a tone receiver 210 which responds to the pulsed carrier tone transmitted from a calling station. When the calling station sends out pulses as the stepping switch 100 thereat continues from the position to which it has been moved by the dial pulses to the final or home position thereof, the tone receiver 210 will respond to these pulses to apply ground to the conductor 211 from the tone receiver 210. Ground is applied through the closed contacts 221 of relay 220 to the coil 231 of relay 230. This will close contacts 232 thereof to complete a circuit from the line 212 from the tone receiver through contacts 222 of relay 220 and contacts 241 of relay 240 to the motor magnet 251 of the exchange selector switch 250. The pulses from the receiver will alternately ground the leads 211 and 212 which will cause operation of the relay 230 to intermittently ground the motor 251 to cause it to operate and step the selector switch. The selector switch will step a number of times corresponding to number of pulses applied from the calling station.

It may be pointed out that there may be a plurality of remote exchanges and that the selector switches at all of these stations will operate at the same time. The number of pulses transmitted will identify one remote exchange, and the selector switch at this one exchange will be wired to operate on this number. In the previous example we assumed that the original number dialed was 7 and that the stepping switches had 26 contacts. Accordingly 19 pulses would be sent as the stepping switch moves from the No. 7 position to home. In order to respond to this number the exchange selector switch must be wired at contact 19 so that when the switch has operated through 19 positions it will make the required connections.

At the exchanges which are not selected by the exchange code which is received, the relay 240 will operate from the strapped connections on the selector switch 250 through contacts 351 of relay 350 to the coil 242 of relay 240. This opens the circuit through contacts 241 to prevent the selector switch 250 from stepping when the extension code is dialed. This also provides a ground for the coil 321 of relay 320 through contacts 243. The contacts 323 of relay 320 energize the slow-operate relay 330 which provides a timed delay. After the delay, the relay 330 shorts out the homing relay 320 which closes the contacts 324 thereof and provides a ground for the selector homing circuit. This circuit which includes the off normal contacts 253 and the interrupter contacts 254 operates the motor magnet 251 to return the selector switch 250 to its normal position so that it is ready for the next operation.

When the selector switch at any particular station stops at the point corresponding to the number for that station, a circuit is set up through the selector switch which energizes relays 220 and 255. The energization of these relays takes place from ground through the coil 223 of relay 220 to a contact (No. 19) of the exchange selector switch and from the rotor of the switch through the coil 256 of relay 255 through the interrupter contact 252 of the selector switch 250 to plus potential. After the relay 255 has operated, it locks itself into the plus potential through its own contacts 257. As has been previously stated, the relay 160 at the calling exchange is slow releasing so that after the dialing ends the relay remains energized sufficiently long for the relay 220 at the dialed exchange to be operated. Release of the relay 160 removes the tone from the carrier so that the tone receiver relay drops out and returns ground to the conductor 212. As the relay 220 is operated, this ground is applied to the coil 261 of relay 260 to energize this relay. This closes the path from the conductor 211 through contact 221 of relay 220 and contact 262 of relay 260 to the motor 271 of the connector stepping switch 270. This conditions the system for the additional pulses identifying the particular extension at the exchange. Relay 260 also closes contacts 264 thereof to establish a circuit through contacts 315 of relay 300 for energizing the relay 90 (Fig. 1) so that busy, ringing and dial tones are made available.

When the called extension code is now dialed from the distant calling extension, the tone receiver again alternately switches ground from the conductor 212 to the conductor 211, and the pulses are applied through the connection just stated to the motor magnet 271 to step the stepping switch from one contact to another as long as the dialing takes place. The coil 281 of relay 280 is connected in parallel with motor magnet 271 of the connector switch 270 in much the same manner as the relay 140 is connected in parallel with the stepping switch 100 in the local connect circuit. The connector switch 270 includes level 272 which makes the connection to the first lines of the various extensions, level 273 which makes connections to the second lines of the extensions, and level 274 which makes connections to third or control line of various extensions.

When the dialing has ceased and the connector switch 270 comes to a stop, connection from the level 274 will be to the control line of the called extension. If this extension is busy, there will be a ground on this line which will be applied through the wiper of level 274 through the contacts 283 of relay 280 to the coil 291 of relay 290. When the relay 280 releases, the relay 290 will be locked in by its coil 292 which is connected through contact 284 of relay 280, its own contacts 293, and through contacts 263 of relay 260 to ground. This will cause the relay 290 to be pulled all the way in to close contacts 294 to apply a busy tone from terminal *b* to line 2 through condenser 215.

If the called line is not busy, however, the bank contact of level 274 will not be grounded. Accordingly when the relay 280 releases, the relay 300 will be operated by connection from ground through contacts 263 of relay 260, contacts 296 of relay 290, relay coil 301, contact 285 of relay 280 and the interrupter contact 275 of the connector switch 270 through resistor 216 to plus potential. The relay 300, when thus energized, will close contacts 302 to ground line 1 of the called extension, and will close contacts 303 to apply ringing signal to the called line 2. This circuit is completed through contacts 316 and coil 311 of relay 310 from the ringing source C, to ring the called extension.

The relay 220 includes contacts 224 for energizing the relay 320 by connection of the coil 321 thereof to ground through resistor 322. This closes contacts 323 to energize the slow-operate relay 330 and opens contacts 324 to remove the homing ground from the selector switch 250 so that this switch remains in the selected position. This arrangement seizes the called exchange during the time of the slow-operate relay while ringing is taking place. When the relay 330 closes it shorts out the coil 321 of relay 320 so that contacts 324 are closed to provide a ground for the selector switch homing circuit which includes off normal contacts 253 and interrupter contacts 254 of the switch 250.

When the called party picks up the receiver, and thereby establishes a direct current connection between the lines, the coil 311 of relay 310 will be energized to close contacts 312 and 313 to thereby connect the carrier audio of the trunk line *f*, *g* to the lines extending to the called extension. Relay 310 closes its contacts 314 to hold itself operated so that the connection is held. Contacts 315 open to remove the ground on the relay 90 which energizes the tone generator providing the dial, busy and ringing tones. In order that the relay 300 does not operate when the stepping switch comes to resting spots, the relay is shorted out by connections from contact No. 10 and 20 through the wiper to ground so that the relay 300 will not open the dialing path at these points.

If the called party answers within the delay period of relay 320, and the relay 310 operates to connect the called extension to the coils 341 and 342 of the relay 340, this connection through the called extension will apply talking battery to the called line and will energize the relay 340. The relay 340 closes contacts 344 to provide a ground for the relay 300, and opens contacts 343 to open the homing circuit extending through the contacts 265 of relay 260 and through the interrupter and off normal contact of the connector switch 270 to the motor magnet 271 thereof. This prevents homing of the connector switch during the conversation. After a conversation is completed the relay 340 is released to close the contacts 343 thereof so that a homing connection is provided for the connector switch 270 to permit it to return to the normal or home position.

It is therefore seen that a common directory dialing system is provided which is particularly suitable for use in telephone systems having a relatively small number of exchanges, each having a relatively small number of extensions. The equipment required at each exchange is quite simple. The number which must be dialed to call a particular extension is the same when calling from another extension in the same exchange or from a different exchange.

The arrangement wherein the homing action of the selector in the exchange from which a call originates provides pulses which are transmitted to the other exchanges to indicate the desired exchange results in a saving of equipment and time. No connection is made to other exchanges when the call is betweeen two extensions in the same exchange to thereby eliminate unnecessary wear of equipment, however when another exchange is desired, pulses for identifying the same are transmitted through the homing action with a minimum of lost time and without extra equipment.

Although one embodiment of the invention has been described which is illustrative thereof, it is obvious that various changes and modifications can be made therein within the intended scope of the invention as defined in the appended claims.

We claim:

1. In a dial telephone system including a plurality of exchanges interconnected by at least one common trunk line, with each of said exchanges including a plurality of dial telephone extensions and switching apparatus controlled by series of pulses from the extensions, said switching apparatus including in combination, a selecting device having a plurality of positions and operating from one position to the next in a step-by-step manner in response to the application of pulses thereto, means for applying a series of dialing pulses from a calling dial telephone extension in the exchange to said selecting device, and circuit means controlled by said selecting device including a first portion rendered operative for making a connection within the exchange in response to dialing of a series of pulses of a particular number, said circuit means including a second portion for making a connection from the exchange to the trunk line in response to dialing of a series of pulses of a number different from said particular number, said circuit means and said selecting device including means for causing step-by-step homing operation of said selecting device through positions thereof to a certain position after a series of pulses has been applied thereto, said selecting device producing a pulse for each step-by-step homing operation thereof after the application thereto of a series of pulses of a number different from said particular number, said second portion of said circuit means applying said pulses produced by said selecting device to the trunk line.

2. In a dial telephone system including a plurality of exchanges interconnected by at least one trunk line, with each of said exchanges including a plurality of dial telephone extensions and switching apparatus controlled by series of pulses from the extensions, said switching apparatus at each exchange including in combination, a stepping switch having a plurality of sets of fixed contacts and movable contacts operating from one set of fixed contacts to the next in a step-by-step manner in response to the application of pulses thereto, circuit means connected to said stepping switch for applying a series of dialing pulses from a calling dial telephone extension in the exchange to said stepping switch, said circuit means including a first portion rendered operative for making a connection within the exchange in response to dialing of a series of pulses of a particular number which causes said movable contacts to engage a predetermined set of fixed contacts, said circuit means including a second portion for making a connection from the exchange to the trunk line in response to dialing of a series of pulses of a number different from said particular number, said circuit means including connections to said stepping switch contacts for causing step-by-step homing operation thereof to a certain position after a series of pulses has been applied thereto, said circuit means including a portion connected to said contacts of said stepping switch for applying a pulse to the trunk line for each step-by-step homing operation of said stepping switch after the application thereto of a series of pulses of a number different from said particular number.

3. In a dial telephone system including a plurality of exchanges interconnected by at least one trunk line, with each of said exchanges including a plurality of dial telephone extensions and switching apparatus controlled by first and second series of pulses from the extensions, said switching apparatus including in combination, a step-by-step device having first and second portions each including a plurality of positions and operating from one position to the next and from one portion to the next in a step-by-step manner in response to the application of pulses thereto, circuit means connected to said step-by-step device including a first portion for applying a first series of dialing pulses from a calling dial telephone extension in the exchange to said device, said circuit means including a second portion rendered operative in response to a series of dialing pulses which operates said device to a predetermined position of said first portion thereof, said circuit means including a portion connected to said step-by-step device for causing step-by-step homing operation thereof through positions thereof to the final position of said first portion thereof after said first series of pulses has been applied thereto, said second portion of said circuit means operating to apply the second series of pulses from said calling dial telephone extension to said step-by-step device to cause the same to operate to a position in said second portion thereof, said second portion of said step-by-step device including portions connected to the telephone extensions of the exchange for selectively establishing connections thereto from the calling telephone extension.

4. In a dial telephone system including a plurality of exchanges interconnected by at least one trunk line, with each of said exchanges including a plurality of dial telephone extensions and switching apparatus controlled by first and second series of pulses from the extensions, said switching apparatus including in combination, a stepping switch having a plurality of positions arranged in first and second groups and operating from one position to the next in a step-by-step manner in response to the application of pulses thereto, circuit means connected to said stepping switch including a first portion for applying a first series of dialing pulses from a calling dial telephone extension in the exchange to said stepping switch, said circuit means including a second portion rendered operative in response to dialing of a series of pulses which operates said stepping switch to a predetermined position in said first group of positions, said circuit means and said stepping switch including means for causing step-by-step operation of said stepping switch through positions thereof to a certain position defining the end of said first group of positions after said first series of pulses has been applied thereto, said second portion of said circuit means operating to apply the second series of pulses from said calling dial telephone extension to said stepping switch to cause the same to operate to a position in said second group, said stepping switch including contacts associated with said positions of said second group connected to the telephone extensions of the exchange for selectively establishing connections thereto from the calling telephone extension.

5. In a dial telephone system including a plurality of exchanges interconnected by at least one trunk line, with each of said exchanges including a plurality of dial telephone extensions and switching apparatus controlled by first and second series of pulses from a calling extension, said switching apparatus including in combination, a stepping switch having a plurality of positions arranged in first and second groups and operating from one position to the next in a step-by-step manner in response to the application of pulses thereto, circuit means connected to said stepping switch for applying the first series of dialing pulses from a calling dial telephone extension in the exchange to said stepping switch, said circuit means including a first portion rendered operative in response to a series of pulses including a particular number which operates said stepping switch to a predetermined position in said first group of positions, said circuit means including a second portion rendered operative for making a connection from the exchange to the trunk line in response to dialing of a series of pulses of a number different from said particular number, said circuit means and said stepping switch including means for causing step-by-step homing operation of said stepping switch through positions thereof to a certain position defining the end of said first group of positions after said first series of pulses has been applied thereto, said stepping switch producing a pulse for each step-by-step homing operation thereof after the application thereto of a series of pulses of a number different from said particular number, said second portion of said circuit means applying said pulses produced by said stepping switch to the trunk line, said circuit means operating to selectively apply the second series of pulses from the calling extension to said stepping switch in response to operation of said first portion of said circuit means, said stepping switch including contacts associated with said positions of said second group and connected to the telephone extensions of the exchange for selectively establishing connections thereto from said calling telephone extensions within the exchange in accordance with the number of pulses in said second series, said circuit means selectively applying said second series of pulses through said connection to the trunk line in response to operation of said second portion of said circuit means, and said switching apparatus at each exchange including means responsive to pulses received through said trunk line from other exchanges for selectively making connections between the trunk line and called extensions of the exchange.

6. In a dial telephone system including a plurality of exchanges interconnected by at least one common trunk line, with each of said exchanges including a plurality of dial telephone extensions and switching apparatus controlled by first and second series of pulses from a calling extension, said switching apparatus including in combination, a stepping switch having a plurality of positions arranged in first and second groups and operating from one position to the next in a step-by-step manner in response to the application of pulses thereto, circuit means connected to said stepping switch for applying the first series of dialing pulses from a calling dial telephone extension in the exchange to said stepping switch, said circuit means including a first portion rendered operative in response to a series of dialing pulses including a particular number which operates said stepping switch to a predetermined position in said first group of positions, said circuit means including a second portion rendered operative for making a connection from the exchange to the trunk line in response to a series of dialing pulses of a number different from said particular number, said circuit means including a portion connected to said stepping switch for causing step-by-step homing operation thereof to a certain position defining the end of said first group of positions after said first series of pulses has been applied thereto, said circuit means applying to said trunk line a pulse for each step-by-step homing operation of said stepping switch after the application thereto of a series of pulses of a number different from said particular number, said circuit means operating to selectively apply the second series of pulses from the calling extension to said stepping switch in response to operation of said first portion, and to selectively apply said second series of pulses through said connection to the trunk line in response to operation of said second portion, said stepping switch including contacts associated with said positions of said second group connected to the telephone extensions of the exchange for selectively establishing connections thereto from said calling telephone extensions within the exchange, and said switching apparatus at each exchange including means responsive to pulses received from other exchanges for selectively making connections between the common trunk line and called extensions at the exchange.

7. In a dial telephone system including a plurality of exchanges interconnected by at least one common trunk line, with each of said exchanges including a plurality of dial telephone extensions and switching apparatus controlled by series of pulses from the extensions, said switching apparatus at each extension including in combination, switch means including a selecting portion responsive to dialing pulses from a calling telephone extension within the exchange and a connecting portion for making connections within the exchange, selecting means responsive to pulses received through the trunk line from other exchanges, and connecting means for making connections between the common trunk line and called telephone extensions at the exchange, said selecting portion having a plurality of positions and operating in a step-by-step manner in response to the application of pulses thereto, said selecting portion being operative in response to a series of pulses of a certain number identifying called extensions within the exchange to render said connecting portion operative, said selecting portion including homing means for providing step-by-step operation of the same to a predetermined position and operating after application thereto of a series of pulses of a number other than said certain number to apply a pulse to the common trunk line for each step-by-step homing operation, said selecting means of each exchange rendering said connecting means thereof operative in response to the receipt from another exchange of a particular number of pulses identifying called extensions within the exchange.

8. In a dial telephone system including a plurality of exchanges interconnected by at least one common trunk line, with each of said exchanges including a plurality of dial telephone extensions and switching apparatus controlled by first and second series of pulses from the extensions, said switching apparatus at each extension including in combination, a stepping switch including a selecting portion for receiving dialing pulses from a calling telephone extension within the exchange and a connecting portion for making connections within the exchange, selecting means for receiving pulses through the trunk line from other exchanges, and connecting means for making connections between the common trunk line and called telephone extensions within the exchange, said stepping switch having a first group of positions in said selecting portion thereof and a second group of positions in said connecting portion thereof and operating in a step-by-step manner from one position to the next in response to the application of pulses thereto, said selecting portion of said stepping switch being operative in response to the first series of pulses of a certain number identifying the same exchange for applying the second series of pulses to said connecting portion for making a connection to a called extension within the exchange, said selecting portion including homing means for providing step-by-step operation of the same to a predetermined position and operating after application thereto of a series of pulses of a number other than said certain number to apply a pulse to the trunk line for each step-by-step homing operation, said selecting means of each exchange being operative in response to the receipt from another exchange of a particular number of pulses identifying the exchange for applying the second series of pulses to said connecting means for making a connection from the common trunk line to a called extension within the exchange.

9. In a dial telephone system including a plurality of exchanges interconnected by at least one trunk line, with each of said exchanges including a plurality of dial telephone extensions and switching apparatus controlled by first and second series of pulses from a calling extension, said switching apparatus including in combination, selecting means having a plurality of positions arranged in first and second groups and operating from one position to the next in a step-by-step manner in response to the application of pulses thereto, circuit means connected to said selecting means for applying thereto the first series of dialing pulses from a calling dial telephone extension in the exchange, said circuit means including a first portion rendered operative in response to a series of pulses of a particular number which operates said selecting means to a predetermined position in said first group of positions, said circuit means including a second portion rendered operative for making a connection from the exchange to the trunk line in response to dialing of a series of pulses of a number different from said particular number, said circuit means and said selecting means including means for causing step-by-step homing operation of said selecting means through positions thereof to a certain position defining the end of said first group of positions after said first series of pulses has been applied thereto and producing a pulse for each step-by-step homing operation thereof after the application thereto of a series of pulses of a number different from said particular number, said second portion of said circuit means applying said produced pulses to the trunk line, said circuit means operating to selectively apply the second series of pulses from the calling extension to said selecting means in response to operation of said first portion of said circuit means, said selecting means including contact means associated with said positions of said second group connected to the telephone extensions of the exchange for selectively establishing connections thereto from said calling telephone extensions within the exchange in accordance with the number of pulses in said second series, said circuit means selectively applying said second series of pulses through said connection to the trunk line in response to operation of said second portion of said circuit means, and said switching apparatus at each exchange including means responsive to pulses received through said trunk line from other exchanges for selectively making connections between the trunk line and called extensions of the exchange.

References Cited in the file of this patent

UNITED STATES PATENTS

| | | |
|---|---|---|
| 2,277,586 | Gray | Mar. 24, 1942 |
| 2,301,523 | Clay | Nov. 10, 1942 |